United States Patent
Sasada

(10) Patent No.: US 8,153,209 B2
(45) Date of Patent: Apr. 10, 2012

(54) CELLULOSE ACYLATE FILM AND METHOD FOR PRODUCING IT, AND POLARIZER AND LIQUID-CRYSTAL DISPLAY DEVICE COMPRISING IT

(75) Inventor: Yasuyuki Sasada, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 980 days.

(21) Appl. No.: 12/086,007

(22) PCT Filed: Dec. 15, 2006

(86) PCT No.: PCT/JP2006/325567
§ 371 (c)(1),
(2), (4) Date: Jun. 4, 2008

(87) PCT Pub. No.: WO2007/069787
PCT Pub. Date: Jun. 21, 2007

(65) Prior Publication Data
US 2009/0280271 A1 Nov. 12, 2009

(30) Foreign Application Priority Data
Dec. 16, 2005 (JP) .................................. 2005-363631

(51) Int. Cl.
*C09K 19/02* (2006.01)
(52) U.S. Cl. ........................................ 428/1.3; 428/1.33
(58) Field of Classification Search .................. None
See application file for complete search history.

(56) References Cited

FOREIGN PATENT DOCUMENTS

| JP | 2002-014230 | * | 1/2002 |
|----|----|----|----|
| JP | 2002-146044 A | | 5/2002 |
| JP | 2004-279931 | * | 10/2004 |
| JP | 2004-279931 A | | 10/2004 |
| JP | 2005-089680 A | | 4/2005 |
| JP | 2005-105139 A | | 4/2005 |
| JP | 2005-266502 A | | 9/2005 |
| JP | 2005-307055 A | | 11/2005 |

OTHER PUBLICATIONS

PCT/ISA/210.
PCT/ISA/237.
Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2006/325567, Jun. 26, 2008, The International Bureau of WIPO, Geneva, CH.

* cited by examiner

*Primary Examiner* — David Sample
*Assistant Examiner* — Nicole Gugliotta
(74) *Attorney, Agent, or Firm* — Buchanan Ingersoll & Rooney PC

(57) ABSTRACT

A cellulose acylate film having a water vapor permeability at 40° C. and 90% RH of from 100 to 400 g/(m²·day), of which the water vapor permeability change after kept at 60° C. and 95% RH for 1000 hours is from −100 g/(m²·day) to 10 g/(m²·day). This film is an excellent optical compensatory film.

6 Claims, No Drawings

CELLULOSE ACYLATE FILM AND METHOD FOR PRODUCING IT, AND POLARIZER AND LIQUID-CRYSTAL DISPLAY DEVICE COMPRISING IT

TECHNICAL FIELD

The present invention relates to a cellulose acylate film having a low water vapor permeability of which the water vapor permeability does not increase even when it is kept under wet heat, and to a method for producing it. The invention also relates to a polarizer comprising the cellulose acylate film, and to a liquid-crystal display device comprising it.

BACKGROUND ART

A polymer film of typically cellulose acylate, polyester, polycarbonate, cycloolefin polymer, vinyl polymer, polyimide and the like is used in silver halide photographic materials, optical compensatory films, polarizers and liquid-crystal display devices. From these polymers, films having more excellent surface smoothness and uniformity can be produced, and therefore the films are widely employed for optical applications.

Of those, a cellulose ester film having a higher water vapor permeability, as compared with other polymer films, can be directly stuck to a most popular polarizing film of polyvinyl alcohol (PVA)/iodine, in on-line operation. Accordingly, cellulose acylate, especially cellulose acetate and cellulose acetate propionate are widely employed for a protective film for polarizers.

On the other hand, however, a polarizing film of polyvinyl alcohol has poor resistance to moisture and therefore water application to the polarizing film may have negative influences on the film in that the degree of polarization of the film may be lowered. Accordingly, the protective film of a polarizer that comprises the polarizing film is required to have a low water vapor permeability.

To satisfy the above-mentioned two requirements, a method has been tried for lowering the water vapor permeability of cellulose acylate film. Concretely, the method comprises adding a hydrophobic additive to cellulose acylate film (e.g., JP-A-2002-146044 and JP-A-2005-89680). However, this is problematic in that, when a hydrophobic additive is added to a hydrophilic cellulose acylate film and when the film is put under wet heat, then the additive may be expelled from the film with the result that the water vapor permeability of the film is to increase.

DISCLOSURE OF THE INVENTION

An object of the invention is to provide a cellulose acylate film having a low water vapor permeability of which the water vapor permeability does not increase even when it is kept under wet heat, and to provide a method for producing it. Another object of the invention is to provide a polarizer of high reliability, which is free from problems of polarization reduction or discoloration even when used for a long period of time, and to provide a liquid-crystal display device of high reliability, which gives good displays even when used for a long period of time.

The above objects can be attained by the following means.

Embodiment 1

A cellulose acylate film having a water vapor permeability at 40° C. and 90% RH of from 100 to 400 g/(m$^2$·day), of which the water vapor permeability change after kept at 60° C. and 95% RH for 1000 hours is from −100 g/(m$^2$·day) to 10 g/(m$^2$·day).

Embodiment 2

The cellulose acylate film of Embodiment 1, wherein the thickness of the film is from 20 to 100 µm.

Embodiment 3

A method for producing a cellulose acylate film, which comprises heat-treating a cellulose acylate film having a water vapor permeability at 40° C. and 90% RH of at least 400 g/(m$^2$·day), at 190° C. or higher.

Embodiment 4

The method of Embodiment 3, wherein the time for the heat treatment is from 0.01 to 60 minutes.

Embodiment 5

The method of Embodiment 3 or 4, wherein the water vapor permeability ratio of the film before and after the heat treatment (water vapor permeability after heat treatment/water vapor permeability before heat treatment) is from 0.2 to 0.9.

Embodiment 6

The method of any one of Embodiments 3 to 5, wherein the heat treatment is attained while both edges of the film are held.

Embodiment 7

A cellulose acylate film produced of the method of any one of Embodiments 3 to 6.

Embodiment 8

The cellulose acylate film of any one of Embodiments 1, 2 and 7, which has at least one layer selected from the group consisting of a hard coat layer, an antiglare layer an antireflection layer and a polymer layer, on the surface.

Embodiment 9

A polarizer comprising at least one cellulose acylate film of Embodiment 1, 2, 7 or 8.

Embodiment 10

A liquid-crystal display device comprising at least one cellulose acylate film of Embodiment 1, 2, 7 or 8, or comprising at least one polarizer of Embodiment 9.

Embodiment 11

A liquid-crystal display device having a structure that comprises a liquid-crystal cell, a polarizing film and a protective film in that order, wherein the protective film is a cellulose acylate film of Embodiment 1, 2, 7 or 8.

The invention provides a cellulose acylate film having a low water vapor permeability of which the water vapor permeability does not increase even when it is kept under wet heat, and provides a method for producing it. The invention also provides a polarizer of high reliability, which comprises the cellulose acylate film of the invention and is free from problems of polarization reduction or discoloration with time, and provides a liquid-crystal display device of high reliability that comprises it.

BEST MODE FOR CARRYING OUT THE INVENTION

The cellulose acylate film and the method for producing it, and the polarizer and the liquid-crystal display device of the invention are described in detail hereinunder. The description of the constitutive elements of the invention given hereinunder may be for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

Cellulose Acylate Film
[Water Vapor Permeability]

The cellulose acylate film of the invention is characterized in that it has a water vapor permeability at 40° C. and 90% RH of from 100 to 400 g/(m$^2$·day) and that the water vapor permeability change after kept at 60° C. and 95% RH for 1000 hours is from −100 g/(m$^2$·day) to 10 g/(m$^2$·day).

In the invention, "water vapor permeability" is determined as follows: A cup with calcium chloride put therein is covered with the film to be tested, then this is put in a closed vessel and left at 40° C. and 90% RH for 24 hours. From the mass change (g/(m$^2$·day)) before and after the conditioning, the water vapor permeability of the film is determined. The water vapor permeability increases with the ambient temperature elevation and with the ambient humidity increase, but not depending on the condition including temperature and humidity, the relationship of the water vapor permeability between different films does not change. Accordingly, in the invention, the water vapor permeability is based on the mass change at 40° C. and 90% RH.

The water vapor permeability of the cellulose acylate film of the invention is from 100 to 400 g/(m$^2$·day), preferably from 120 to 350 g/(m$^2$·day), more preferably from 150 to 300 g/(m$^2$·day).

In addition, the film is kept 60° C. and 95% RH for 1000 hours, and its water vapor permeability is determined before and after the conditioning, according to the above method. The value obtained by subtracting the water vapor permeability of the conditioned film from the water vapor permeability of the unconditioned film is "water vapor permeability change of the film, after kept at 60° C. and 95% RH for 1000 hours".

The water vapor permeability change of the cellulose acylate film of the invention, after kept at 60° C. and 95% RH for 1000 hours, is from −100 g/(m$^2$·day) to 10 g/(m$^2$·day), preferably from −50 g/(m$^2$·day) to 5 g/(m$^2$·day), more preferably from −20 g/(m$^2$·day) to 0 g/(m$^2$·day).

The water vapor permeability lowers with the increase in the film thickness and increases with the reduction in the film thickness. Accordingly, the found water vapor permeability value is multiplied by the found film thickness value, and then divided by 80, and the resulting value is the "water vapor permeability in terms of the film having a thickness of 80 μm" in the invention.

The water vapor permeability of the cellulose acylate film of the invention is preferably from 100 to 420 g/(m$^2$·day), more preferably from 150 to 400 g/(m$^2$·day), even more preferably from 180 to 350 g/(m$^2$·day), in terms of the film having a thickness of 80 μm.

When the cellulose acylate film satisfying the condition that relates to the water vapor permeability thereof is used, then a polarizer having excellent durability to moisture or wet heat, as well as a liquid-crystal display device of high reliability may be provided.

[Thickness of the Film]

The thickness of the cellulose acylate film of the invention is preferably 20 to 100 μm, more preferably 40 to 90 μm, even more preferably 60 to 80 μm. When the thickness is less than 20 μm or more than 100 μm, it may be hard to handle the film in preparation of a polarizer or the prepared polarizer may curl. The thickness fluctuation of the cellulose acylate film of the invention in the conveyance direction and in the direction of width is preferably 0 to 2%, more preferably 0 to 1.5%, even more preferably 0 to 1%.

[Cellulose Acylate]

The cellulose acylate film of the invention comprises cellulose acylate as the essential polymer ingredient thereof. The "essential polymer ingredient" as referred to herein is, when the film is formed of a single polymer, that single polymer; but when the film is formed of plural polymers, then the polymer having a highest mass fraction of those constitutive polymers is the "essential polymer ingredient".

The cellulose acylate to be used in producing the cellulose acylate film of the invention may be powdery or granular, or may also be in the form of pellets. Preferably, the water content of the cellulose acylate is at most 1.0% by mass, more preferably at most 0.7% by mass, most preferably at most 0.5% by mass. As the case may be, the water content is preferably at most 0.2% by mass. In case where the water content of the cellulose acylate oversteps the preferred range, then it is desirable to use the polymer after dried by heating.

One or more these polymers may be used herein either singly or as combined.

The cellulose acylate includes cellulose acylate compounds, and acyl-substituted cellulose skeleton-having compounds that are produced by biologically or chemically introducing a functional group to a starting cellulose material.

The cellulose acylate is an ester of cellulose and a carboxylic acid. The carboxylic acid that constitutes the ester is preferably a fatty acid having from 2 to 22 carbon atoms, most preferably a lower fatty acid having from 2 to 4 carbon atoms.

In the cellulose acylate, all or a part of the hydrogen atoms of the hydroxyl groups existing at the 2-, 3- and 6-positions of the glucose unit that constitutes cellulose are substituted with an acyl group. Examples of the acyl group are an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, a cinnamoyl group. The acyl group is preferably an acetyl group, a propionyl group, a butyryl group, a dodecanoyl group, an octadecanoyl group, a pivaloyl group, an oleoyl group, a benzoyl group, a naphthylcarbonyl group, a cinnamoyl group, most preferably an acetyl group, a propionyl group, a butyryl group.

The cellulose acylate may be substituted with plural acyl groups. Concretely, it includes cellulose acetate propionate, cellulose acetate butyrate, cellulose acetate butyrate propionate, cellulose butyrate propionate.

The cellulose acylate to constitute the cellulose acylate film of the invention is especially preferably cellulose acetate having an ester with acetic acid. From the viewpoint of its solubility in solvent, more preferred is cellulose acetate having a degree of acetyl substitution of from 2.70 to 2.87, and most preferred is cellulose acetate having a degree of acetyl substitution of from 2.80 to 2.86. The degree of substitution as referred to herein means a degree of substitution of the hydrogen atom of the hydroxyl group existing in the 2-, 3- and 6-positions of the glucose unit to constitute cellulose; and when all the hydrogen atoms of the 2-, 3- and 6-positioned hydroxyl groups are substituted, then the degree of substitution is 3.

The basic principle of a method of production of cellulose acylate is described in Nobuhiko Migita, et al., *Wood Chemistry*, pp. 180-190 (Kyoritsu Publishing, 1968). One typical production method is a liquid-phase acetylation method with a carboxylic acid anhydride-carboxylic acid-sulfuric acid catalyst. Concretely, a cellulose material such as cotton linter or wood pulp is pretreated with a suitable amount of a carboxylic acid such as acetic acid, then esterified by putting it into a previously-cooled acylation mixture liquid to thereby produce a complete cellulose acylate (the total of the degree of acylation at the 2-, 3- and 6-positions thereof is almost 3.00). The acylation mixture liquid generally contains a carboxylic acid serving as a solvent, a carboxylic acid anhydride serving as an esterifying agent and sulfuric acid serving as a catalyst. In general, the amount of the carboxylic acid anhydride is a stoichiometrically excessive amount over the total amount of the cellulose to be reacted with it and water existing in the system.

After the acylation, the excessive carboxylic acid anhydride still remaining in the system is hydrolyzed, for which water or water-containing acetic acid is added thereto. Then, a part of the esterification catalyst is neutralized, for which an aqueous solution of a neutralizing agent (e.g., calcium, magnesium, iron, aluminum or zinc carbonate, acetate, hydroxide or oxide) may be added to the system. Next, the obtained complete cellulose acylate is kept at 20 to 90° C. in the presence of a small amount of an acylation catalyst (generally, this is the remaining sulfuric acid) to thereby saponify and ripen it into a cellulose acylate having a desired degree of acyl substitution and a desired degree of polymerization. When the desired cellulose acylate is obtained, the catalyst still remaining in the system is completely neutralized with the above-mentioned neutralizing agent, or not neutralized, the cellulose acylate solution is put into water or diluted acetic acid (or water or diluted acetic acid is put into the cellulose acylate solution) to thereby separate the cellulose acylate, which is then washed and stabilized to be the intended cellulose acylate.

The degree of polymerization of the cellulose acylate is preferably from 150 to 500 in terms of the viscosity-average degree of polymerization thereof, more preferably from 200 to 400, even more preferably from 220 to 350. The viscosity-average degree of polymerization may be measured according to an Uda et al's limiting viscosity method (Kazuo Uda, Hideo Saito; the *Journal of the Society of Fiber Science and Technology of Japan*, Vol. 18, No. 1, pp. 105-120, 1962). The method for measuring the viscosity-average degree of polymerization is described also in JP-A-9-95538.

Cellulose acylate having a small amount of a low-molecular component may have a high mean molecular weight (degree of polymerization), but its viscosity is generally lower than that of ordinary cellulose acylate. Cellulose acylate having a small amount of a low-molecular component may be obtained by removing the low-molecular component from cellulose acylate produced in an ordinary manner. The removal of the low-molecular component may be attained by washing cellulose acylate with a suitable organic solvent. Further, cellulose acylate having a small amount of a low-molecular component may also be obtained by synthesis. When cellulose acylate having a small amount of a low-molecular component therein is produced, it is desirable that the amount of the sulfuric acid catalyst for use in acylation is controlled to be from 0.5 to 25 parts by mass relative to 100 parts by mass of cellulose. When the amount of the sulfuric acid catalyst is within the above range, then cellulose acylate may be produced which is favorable in point of the molecular weight distribution thereof (having a uniform molecular weight distribution).

The starting cellulose for cellulose ester and the method for producing it are described also in Hatsumei Kyokai Disclosure Bulletin (No. 2001-1745, published by the Hatsumei Kyokai on Mar. 15, 2001), pp. 7-12.

Production of Cellulose Acylate Film

The cellulose acylate film of the invention may be produced from a solution that contains cellulose acylate and various additives, according to a solution-casting film formation method. The solution-casting film formation method is described in detail hereinunder.

In case where the melting point of cellulose acylate to be used in the invention, or the melting point of the mixture of the cellulose acylate and various additives is lower than the decomposition point thereof and higher than the stretching temperature, then the film of the invention may also be formed according to a melt-casting film formation method. The melt-casting film formation method is described, for example, in JP-A-2000-352620.

[Cellulose Acylate Solution]

Solvent:

When the cellulose acylate film of the invention is produced according to a solution-casting film formation method, a cellulose acylate solution is prepared. The essential solvent for the cellulose acylate solution to be used in this case is preferably an organic solvent that is a good solvent for the cellulose acylate. The organic solvent of the type is preferably an organic solvent having a boiling point of not higher than 80° C. from the viewpoint of reducing the drying load. More preferably, the boiling point of the organic solvent is from 10 to 80° C., even more preferably from 20 to 60° C. As the case may be, an organic solvent having a boiling point of from 30 to 45° C. may also be favorably used for the essential solvent.

The essential solvent includes halogenohydrocarbons, esters, ketones, ethers, alcohols and hydrocarbons. These may have a branched structure or a cyclic structure. The essential solvent may have two or more functional groups of ester, ketone, ether and alcohol (i.e., —O—, —CO—, —COO—, —OH). The hydrogen atom in the hydrocarbon moiety of the above ester, ketone, ether and alcohol may be substituted with a halogen atom (especially, fluorine atom). The essential solvent for cellulose acylate for use in the production of the cellulose acylate film of the invention is, when it is a single solvent, that single solvent; but when it is plural solvents, then the solvent having a highest mass fraction of those constitutive solvents is the essential solvent.

The halogenohydrocarbon is preferably a chlorohydrocarbon, for example, including dichloromethane and chloroform. More preferred is dichloromethane.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent to be used along with the essential solvent includes halogenohydrocarbons, esters, ketones, ethers, alcohols, and hydrocarbons. These may have a branched structure or a cyclic structure. The organic solvent may have two or more functional groups of ester, ketone, ether and alcohol (i.e., —O—, —CO—, —COO—, —OH). The hydrogen atom in the hydrocarbon moiety of the above ester, ketone, ether and alcohol may be substituted with a halogen atom (especially, fluorine atom).

The halogenohydrocarbon is preferably a chlorohydrocarbon, for example, including dichloromethane and chloroform. More preferred is dichloromethane.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol.

The hydrocarbon includes, for example, n-pentane, cyclohexane, n-hexane, benzene, toluene, xylene.

The solvent having at least two functional groups include, for example, 2-ethoxyethyl acetate, 2-methoxyethanol, 2-butoxyethanol, methyl acetacetate.

For the cellulose acylate film of the invention, the solvent preferably contains alcohol in an amount of from 5 to 30% by mass of the overall solvent, more preferably from 7 to 25% by mass, even more preferably from 10 to 20% by mass, from the viewpoint of reducing the film-peeling load from a band.

Hereinunder described are preferred examples of a combination of organic solvents that are favorably used as a solvent for the cellulose acylate solution to be used in producing the cellulose acylate film of the invention, to which, however, the solvent combination usable in the invention should not be limited. The numerical value for the ratio means part by mass.
(1) dichloromethane/methanol/ethanol/butanol=80/10/5/5
(2) dichloromethane/methanol/ethanol/butanol=80/5/5/10
(3) dichloromethane/isobutyl alcohol=90/10
(4) dichloromethane/acetone/methanol/propanol=80/5/5/10
(5) dichloromethane/methanol/butanol/cyclohexane=80/8/10/2
(6) dichloromethane/methyl ethyl ketone/methanol/butanol=80/10/5/5
(7) dichloromethane/butanol=90/10
(8) dichloromethane/acetone/methyl ethyl ketone/ethanol/butanol=68/10/10/7/5
(9) dichloromethane/cyclopentanone/methanol/pentanol=80/2/15/3
(10) dichloromethane/methyl acetate/ethanol/butanol=70/12/15/3
(11) dichloromethane/methyl ethyl ketone/methanol/butanol=80/5/5/10
(12) dichloromethane/methyl ethyl ketone/acetone/methanol/pentanol=50/20/15/5/10
(13) dichloromethane/1,3-dioxolan/methanol/butanol=70/15/5/10
(14) dichloromethane/dioxane/acetone/methanol/butanol=75/5/10/5/5
(15) dichloromethane/acetone/cyclopentanone/ethanol/isobutyl alcohol/cyclohexane=60/18/3/10/7/2
(16) dichloromethane/methyl ethyl ketone/acetone/isobutyl alcohol=70/10/10/10
(17) dichloromethane/acetone/ethyl acetate/butanol/hexane=69/10/10/10/1
(18) dichloromethane/methyl acetate/methanol/isobutyl alcohol=65/15/10/10
(19) dichloromethane/cyclopentanone/ethanol/butanol=85/7/3/5
(20) dichloromethane/methanol/butanol=83/15/2
(21) dichloromethane=100
(22) acetone/ethanol/butanol=80/15/5
(23) methyl acetate/acetone/methanol/butanol=75/10/10/5
(24) 1,3-dioxolan=100
(25) dichloromethane/methanol=85/15
(26) dichloromethane/methanol=92/8
(27) dichloromethane/methanol=90/10
(28) dichloromethane/methanol=87/13
(29) dichloromethane/ethanol=90/10

The details of a case where a non-halogen organic solvent is the essential solvent are described in Hatsumei Kyokai Disclosure Bulletin (No. 2001-1745, published by the Hatsumei Kyokai on Mar. 15, 2001), and they may be suitably referred to herein.

Solution Concentration:

The cellulose acylate concentration in the cellulose acylate solution to be prepared herein is preferably from 5 to 40% by mass, more preferably from 10 to 30% by mass, most preferably from 15 to 30% by mass.

The cellulose acylate concentration may be controlled in such a manner that it could have a predetermined concentration in the stage where cellulose acylate is dissolved in a solvent. A low-concentration solution (e.g., from 4 to 14% by mass) may be previously prepared, and it may be concentrated by evaporation of the solvent. A high-concentration solution may be prepared, and it may be diluted. When additives are added thereto, the cellulose acylate concentration of the solution may also be lowered.

Additives:

The cellulose acylate solution to be used for producing the cellulose acylate film of the invention may contain various liquid or solid additives added thereto in each preparation step, in accordance with the application of the film. Examples of the additives are plasticizer (its preferred amount is from 0.01 to 10% by weight of cellulose acylate—the same shall apply hereinunder), UV absorbent (0.001 to 1% by mass), fine powder having a mean particle size of from 5 to 3000 nm (0.001 to 1% by mass), fluorine-containing surfactant (0.001 to 1% by mass), release agent (0.0001 to 1% by mass), antioxidant (0.0001 to 1% by mass), optical anisotropy controller (0.01 to 10% by mass), IR absorbent (0.001 to 1% by mass).

The plasticizer and the optical anisotropy controller are organic compounds having a molecular weight of at most 3000, preferably having both a hydrophobic moiety and a hydrophilic moiety. These compounds may change film retardation through alignment in cellulose acylate chains. In addition, these compounds may increase the hydrophobicity of the film and may reduce the humidity-dependent retardation change thereof. When the film contains the above-mentioned UV absorbent and IR absorbent, then the wavelength-dependent retardation of the film may be effectively controlled. Preferably, the additives to the cellulose acylate film of the invention are all substantially free from evaporation during the step of drying the film.

From the viewpoint of reducing the humidity-dependent retardation change of the film, the amount of the additive to be added to the film is preferably larger. However, the increase in the amount of the additive in the cellulose acylate film may often cause problems in that the glass transition temperature (Tg) of the film may lower, and the additive may evaporate away during production of the film. Accordingly, when the polymer is cellulose acetate that is preferably used in the invention, then the amount of the additive having a molecular weight of at most 3000 is preferably from 0.01 to 30% by mass of the cellulose acylate, more preferably from 2 to 30% by mass, even more preferably from 5 to 20% by mass.

The plasticizer preferably used in the cellulose acylate film of the invention is described in JP-A-2001-151901. The IR absorbent is described in JP-A-2001-194522. The time when the additive is added to the polymer may be suitably determined depending on the type of the additive. The additives are also described in Hatsumei Kyokai Disclosure Bulletin (No. 2001-1745, published by the Hatsumei Kyokai on Mar. 15, 2001), pp. 16-22.

Preparation of Cellulose Acylate Solution:

The cellulose acylate solution may be prepared, for example, according to the method described in JP-A-2005-104148, pp. 106-120. Concretely, cellulose acylate and a solvent are mixed, stirred and swollen, and optionally cooled or heated to dissolve the polymer, and this is filtered to obtain the cellulose acylate solution.

[Casting, Drying]

Using an ordinary solution-casting film formation apparatus, the cellulose acylate film of the invention may be produced according to an ordinary solution-casting film formation method. Concretely, a dope (cellulose acylate solution) prepared in a dissolver (tank) is filtered, and then it is once stored in a storage tank in which the dope is defoamed to be a final dope. The dope is kept warmed at 30° C., and fed into a pressure die from the dope take-out port, for example, via a pressure meter gear pump via which a predetermined amount of the dope may be accurately fed to the die by controlling the revolution thereof, and then the dope is then uniformly cast onto a metal support in a casting zone that runs endlessly, through the slit of the pressure die (casting step). Next, at the peeling point at which the metal support runs almost one-round, a wet dope film (this may be referred to as a web) is peeled from the metal support, and then transported to a drying zone, in which the web is dried while transported therein by rolls. In the invention, a metal band or a metal drum may be used for the metal support.

The details of the casting step and the drying step are described also in JP-A-2005-104148, pp. 120-146, and these may be suitably applied to the invention.

The residual solvent amount in the thus-dried film is preferably from 0 to 2% by mass, more preferably from 0 to 1% by mass. After dried, the film may be directly transported to a heat-treatment zone, or after the film is once wound up, it may be subjected to off-line heat treatment. Preferably, the cellulose acylate film before heat treatment has a width of from 0.5 to 5 m, more preferably from 0.7 to 3 m. In case where the film is once wound up, then, the preferred length of the wound film is from 300 to 30000 m, more preferably from 500 to 10000 m, even more preferably from 1000 to 7000 m.

[Heat Treatment]

Water Vapor Permeability:

In the invention, the cellulose acylate film formed in the above is heat-treated under an extremely high temperature condition, for the purpose of attaining the intended water vapor permeability of the film. The water vapor permeability at 40° C. and 90% RH of the cellulose acylate film to be used herein is at least 400 g/(m²·day), preferably from 400 to 1200 g/(m²·day), more preferably from 420 to 800 g/(m²·day), even more preferably from 450 to 600 g/(m²·day).

In this case, the ratio of the water vapor permeability at 40° C. and 90% RH of the film before and after the heat treatment (water vapor permeability after heat treatment/water vapor permeability before heat treatment) is preferably from 0.2 to 0.9, more preferably from 0.4 to 0.8, even more preferably from 0.5 to 0.7.

When a cellulose acylate film is produced according to the heat-treatment method, then the film may be resistant to wet heat. In the invention, it is thought that the reduction of the water vapor permeability can be attained by coagulation of the cellulose acylate molecules caused by the heat-treatment. When the heat-treated film is kept under wet heat, it is free from deterioration of function that is seen in a cellulose acylate film containing a hydrophobic additive.

Temperature:

In the heat-treatment step in the production method of the invention, the cellulose acylate film is kept at 190° C. or higher. The heat-treatment temperature is preferably 200° C. or higher, more preferably from 210 to 270° C., even more preferably from 220 to 250° C. When the heat-treatment temperature is set within the range, then the cellulose acylate film of the invention may be produced which has a low water vapor permeability and of which the water vapor permeability does not increase even when it is kept under wet heat. The water vapor permeability of thus produced cellulose acylate film at 40° C. and 90% RH is preferably from 100 to 400 g/(m²·day), more preferably from 120 to 350 g/(m²·day), even more preferably from 150 to 300 g/(m²·day). The water vapor permeability change of the cellulose acylate film, after kept at 60° C. and 95% RH for 1000 hours, is preferably from −100 g/(m²·day) to 10 g/(m²·day), more preferably from −50 g/(m²·day) to 5 g/(m²·day), even more preferably from −20 g/(m²·day) to 0 g/(m²·day).

Heat-Treatment Method:

In general, the heat treatment may be attained by making the film pass through a high-temperature zone while being conveyed therein. In this stage, both edges of the film may be held by clips and the film may be heated in that condition. The heating may also be attained in an apparatus having a heating zone between at least 2 rolls. In this case, rolls may be suitably disposed in the heating zone. Alternatively, the heat treatment may be attained by contact with a heated roll. Of such heating methods, preferred is the method of heating the film while both edges of the film are held by clips and conveyed in a heating zone in view of maintaining the desirable surface condition of the film.

Time:

The time for the heat treatment is preferably from 0.01 to 60 minutes, more preferably from 0.02 to 30 minutes, even more preferably from 0.03 to 10 minutes, still more preferably from 0.05 to 5 minutes, and as the case may be, further more preferably from 0.1 to 2 minutes.

[Stretching]

In the production method of the invention, it is also desirable that the cellulose acylate film is stretched at the same temperature as the above heat-treatment temperature for the purpose of further lowering the water vapor permeability of the film.

Stretching Method:

The film may be stretched by holding its both edges with clips and expanding it in the direction vertical to the machine direction thereof (cross stretching), or may be stretched in an apparatus having a heating zone between at least two nip rolls (machine-direction stretching). The draw ratio in stretching may be suitably determined depending on the necessary modulus of elasticity of the stretched film. Preferably, it is from 10 to 500%, more preferably from 30 to 200%, even more preferably from 50 to 150%, still more preferably from 70 to 100%. The stretching may be effected in one stage or in multiple stages. The "draw ratio in stretching (%)" as referred to herein is defined as in the following formula. The pulling speed is preferably from 20 to 10000%/min, more preferably from 50 to 5000%/min, even more preferably from 100 to 1000%/min, still more preferably from 150 to 800%/min.

$$\text{Draw Ratio}(\%) = 100 \times \{(\text{length after stretching}) - (\text{length before stretching})\} / (\text{length before stretching}).$$

[Surface Treatment]

The cellulose acylate film of the invention may be suitably surface-treated so as to improve its adhesion to various functional layers (e.g., undercoat layer, back layer, optically-anisotropic layer, a hard coat layer, an antiglare layer, an antireflection layer and a polymer layer). The surface treatment includes glow discharge treatment, UV irradiation treatment, corona treatment, flame treatment, saponification treatment (acid saponification, alkali saponification); and glow discharge treatment and alkali saponification treatment are preferred. The "glow discharge treatment" is a treatment of processing a film surface with plasma in the presence of a plasma-exciting vapor. The details of the surface treatment are described in Hatsumei Kyokai Disclosure Bulletin (No. 2001-1745, published by the Hatsumei Kyokai on Mar. 15, 2001), and may be suitably applied to the invention.

For improving the adhesiveness between the film surface and a functional layer thereon, an undercoat layer (adhesive layer) may be provided on the cellulose acylate film of the invention, in addition to the surface treatment or in place of the surface treatment. The undercoat layer is described in Hatsumei Kyokai Disclosure Bulletin (No. 2001-1745, published by the Hatsumei Kyokai on Mar. 15, 2001), p. 32 and p. 45 (in which the undercoat layer is referred to as readily-adhesive layer), which may be suitably applied to the invention. The functional layers that may be provided on the cellulose acylate film of the invention are described in Hatsumei Kyokai Disclosure Bulletin (No. 2001-1745, published by the Hatsumei Kyokai on Mar. 15, 2001), pp. 32-45, and they may be suitably applied to the invention.

[Functional Layer]

As the case may be, the cellulose acylate film of the invention may be applied to a hard coat layer, an antiglare layer and an antireflection layer. For the purpose of improving the visibility of LCD, PDP, CRT or EL flat panel displays or controlling water vapor permeability of the film, any or all of a hard coat layer, an antiglare layer and an antireflection layer may be given to one face or both faces of the cellulose acylate film of the invention.

Hardcoat Layer:

Preferred embodiments of such hardcoat layers are described in detail in JP-A-2005-104148, pp. 187-189, and these are also preferred for the cellulose acylate film of the invention.

Antiglare Layer:

Preferred embodiments of such antiglare layers are described in detail in JP-A-2005-104148, pp. 187-189, and these are also preferred for the cellulose acylate film of the invention.

Antireflection Layer:

Preferred embodiments of such antireflection layers are described in detail in JP-A-2005-104148, pp. 187-189, and these are also preferred for the cellulose acylate film of the invention.

Polymer Layer:

Examples of the polymer for the polymer layer include polyolefins (e.g., polyethylene, polypropylene, norbornene-based polymers), polycarbonates, polyacrylates, polysulfones, polyvinyl alcohols, polymethacrylates, polyacrylates, polyvinylidene chlorides, and cellulose esters (e.g., cellulose triacetate, cellulose diacetate), and the polymer may be a copolymer of these polymers or a polymer mixture. The polymer layer may be formed by applying a polymer solution onto the cellulose acylate film of the invention, or may also be formed according to a successive casting system or a co-casting system in casting the cellulose acylate film of the invention. A previously-formed polymer film may be laminated on the cellulose acylate film of the invention, using a sticky paste or an adhesive.

[Optical Compensatory Film]

As the case may be, the cellulose acylate film of the invention may be used as an optical compensatory film. "Optical compensatory film" is meant to indicate an optical material having optical anisotropy which is used generally in display devices such as liquid-crystal display devices, and it has the same meaning as that of retardation film, retardation plate, optical compensatory sheet. In a liquid-crystal display device, the optical compensatory film is used for the purpose of increasing the display panel contrast and of improving the viewing angle characteristics and the color-expressing capability of the device.

The cellulose acylate film of the invention may be used as an optical compensatory film directly as it is. A plurality of the cellulose acylate films of the invention may be laminated, or the cellulose acylate film of the invention may be laminated with any other film falling outside the invention to thereby suitably control Re and Rth of the resulting laminate serving as an optical compensatory film. The films may be laminated with a sticky agent or adhesive.

As the case may be, the cellulose acylate film of the invention may be used as a support of an optical compensatory film, and an optically-anisotropic layer of liquid crystal or the like may be provided on it to construct an optical compensatory film. The optically-anisotropic layer to be applied to the optical compensatory film of the invention may be formed of, for example, a liquid-crystalline compound-containing composition or a birefringent cellulose acylate film.

The liquid-crystalline compound is preferably a discotic liquid-crystalline compound or a rod-shaped liquid-crystalline compound.

[Discotic Liquid-Crystalline Compound]

Examples of discotic liquid-crystalline compounds usable in the invention as the above liquid-crystalline compound are described in various documents (e.g., C. Destrade et al., *Mol. Cryst. Liq. Cryst.*, Vol. 71, p. 111 (1981); Quarterly Journal of General Chemistry, edited by the Chemical Society of Japan, No. 22, *Chemistry of Liquid Crystal*, Chap. 5, Chap. 10, Sec. 2 (1994); B. Kohne et al., *Angew. Che. Soc. Chem. Comm.*, p. 1794 (1985): J. Zhang et al., *J. Am. Chem. Soc.*, Vol. 116, p. 2655 (1994)).

In the optically-anisotropic layer, the discotic liquid-crystalline molecules are preferably fixed as aligned. Most preferably, the molecules are fixed through polymerization. Polymerization of discotic liquid-crystalline molecules is described in JP-A-8-27284. For fixing the discotic liquid-crystalline molecules through polymerization, a substituent of a polymerizing group must be bonded to the discotic core of the discotic liquid-crystalline molecules. However, when a polymerizing group is bonded directly to the discotic core, then the molecules could hardly keep their alignment state during polymerization. Accordingly, a linking group is introduced between the discotic core and the polymerizing group. Polymerizing group-having discotic liquid-crystalline molecules are described in JP-A-2001-4387.

[Rod-Shaped Liquid-Crystalline Compound]

Examples of rod-shaped liquid-crystalline compounds usable in the invention as the above liquid-crystalline compound are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolanes and alkenylcyclohexylbenzonitriles. The rod-shaped liquid-crystalline compound for use herein is not limited to these low-molecular liquid-crystalline compounds but includes polymer liquid-crystalline compounds.

In the optically-anisotropic layer, the rod-shaped liquid-crystalline molecules are preferably fixed as aligned. Most preferably, the molecules are fixed through polymerization. Examples of the polymerizing rod-shaped liquid-crystalline compound usable in the invention are described, for example, in *Makromol. Chem.*, Vol. 190, p. 2255 (1989); *Advanced Materials*, Vol. 5, p. 107 (1993); U.S. Pat. Nos. 4,683,327, 5,622,648, 5,770,107, WO95/22586, WO95/24455, WO97/00600, WO98/23580, WO98/52905, JP-A-1-272551, JP-A-6-16616, JP-A-7-110469, JP-A-11-80081, JP-A-2001-328973.

Optically-Anisotropic Layer of Polymer Film:

The optically-anisotropic layer may also be formed of a polymer film. The polymer film may be formed of a polymer capable of expressing optical anisotropy. Examples of the polymer capable of expressing optical anisotropy include polyolefins (e.g., polyethylene, polypropylene, norbornene-based polymer), polycarbonates, polyarylates, polysulfones, polyvinyl alcohols, polymethacrylates, polyacrylates, and cellulose esters (e.g., cellulose triacetate, cellulose diacetate). The polymer may also be a copolymer of those polymers or a mixture thereof. For the purpose of increasing optical anisotropy, the cellulose acylate film of the invention may be stretched after the polymer film layer is formed on the film.

Polarizer

The cellulose acylate film or the optical compensatory film of the invention may be sued as a protective film of a polarizer (the polarizer of the invention). The polarizer of the invention comprises a polarizing film and two polarizer-protective films (cellulose acylate films) for protecting both surfaces of the polarizing film, in which the cellulose acylate film or the optical compensatory film of the invention may be used as at least one polarizer-protective film. The cellulose acylate film of the invention may be stuck to a polarizing film with an adhesive in a roll-to-roll line mode.

In case where the cellulose acylate film of the invention is used as the above-mentioned, polarizer-protective film, it is desirable that the cellulose acylate film of the invention is subjected to the above-mentioned surface treatment (as in JP-A-6-94915, JP-A-6-118232) for hydrophilicating its surface. For example, the film is preferably processed by glow discharge treatment, corona discharge treatment of alkali saponification. In particular, alkali saponification is the most preferred for the surface treatment.

The polarizing film for use herein may be prepared by dipping a polyvinyl alcohol film in an iodine solution and stretching it. In case where such a polarizing film prepared by dipping a polyvinyl alcohol film in an iodine solution and stretching it is used, the cellulose acylate film of the invention may be directly stuck to both surfaces of the polarizing film with an adhesive, with its surface-treated face being inside of the resulting structure. In the production method of the invention, it is desirable that the cellulose acylate film is directly stuck to a polarizing film in that manner. The adhesive may be an aqueous solution of polyvinyl alcohol or polyvinyl acetal (e.g., polyvinyl butyral), or a latex of a vinylic polymer (e.g., polybutyl acrylate). An aqueous solution of a completely-saponified polyvinyl alcohol is especially preferred for the adhesive.

In a liquid-crystal display device, in general, a liquid-crystal cell is provided between two polarizers. The device therefore has four polarizer-protective films. The cellulose acylate film of the invention may be favorably applied to any of those four polarizer-protective films. More preferably, the cellulose acylate film of the invention is used as an outer protective film in a liquid-crystal display device, not disposed between the polarizing film and the liquid-crystal layer (liquid-crystal cell) therein. In this case, a hard-coat layer, an antiglare layer and an antireflection layer may be provided on the polymer film.

Liquid-Crystal Display Device

The cellulose acylate film, the optical compensatory film and the polarizer of the invention may be used in liquid-crystal display devices of various display modes. The cellulose acylate film and the optical compensatory film of the invention have a low water vapor permeability, of which the water vapor permeability does not increase even when they are exposed to wet heat, and therefore, in the polarizer comprising it, the film of the invention prevents the polarization depression for a long period of time. Accordingly, the invention provides liquid-crystal display devices of high reliability.

Various liquid-crystal modes in which the film is used are described below. The liquid-crystal display devices may be any of transmission-type, reflection-type or semitransmission-type ones.

TN-Mode Liquid-Crystal Display Device:

The cellulose acylate film of the invention may be used as a support of the optical compensatory film in a TN-mode liquid-crystal display device having a TN-mode liquid-crystal cell. TN-mode liquid-crystal cells and TN-mode liquid-crystal display devices are well known from the past. The optical compensatory film for use in TN-mode liquid-crystal display devices is described in JP-A-3-9325, JP-A-6-148429, JP-A-8-50206, JP-A-9-26572; and in Mori et al's reports (*Jpn. J. Appl. Phys.*, Vol. 36 (1997), p. 143; *Jpn. J. Appl. Phys.*, Vol. 36 (1997), p. 1068).

STN-Mode Liquid-Crystal Display Device:

The cellulose acylate film of the invention may be used as a support of the optical compensatory film in an STN-mode liquid-crystal display device having an STN-mode liquid-crystal cell. In an STN-mode liquid-crystal display device, in general, the rod-shaped liquid-crystalline molecules in the liquid-crystal cell are twisted within a range of from 90 to 360 degrees, and the product ($\Delta$nd) of the refractivity anisotropy ($\Delta$n) of the rod-shaped liquid-crystalline molecules and the cell gap (d) falls within a range of from 300 to 1500 nm. Optical compensatory films for use in STN-mode liquid-crystal display devices are described in JP-A-2000-105316.

VA-Mode Liquid-Crystal Display Device:

The cellulose acylate film of the invention may be used as the optical compensatory film or as a support of the optical compensatory film in a VA-mode liquid-crystal display device having a VA-mode liquid-crystal cell. The VA-mode liquid-crystal display device may be a domain-division system device, for example, as in JP-A-10-123576.

IPS-Mode Liquid-Crystal Display Device and ECB-Mode Liquid-Crystal Display Device:

The cellulose acylate film of the invention can be especially advantageously used as the optical compensatory film, as a support of the optical compensatory film or as a protective film of the polarizer in an IPS-mode liquid-crystal display device and an ECB-mode liquid-crystal display device having an IPS-mode or ECB-mode liquid-crystal cell. In these modes, the liquid-crystal display material is aligned nearly in parallel to each other at the time of black level of display, and under a condition of no voltage application thereto, the liquid-crystal molecules are aligned in parallel to the substrate face to give black display.

OCB-Mode Liquid-Crystal Display Device and HAN-Mode Liquid-Crystal Display Device:

The cellulose acylate film of the invention is advantageously used as a support of the optical compensatory film in an OCB-mode liquid-crystal cell-having OCB-mode liquid-crystal display device or in a HAN-mode liquid-crystal cell-having HAN-mode liquid-crystal display device. It is desirable that, in the optical compensatory film in an OCB-mode liquid-crystal display device and in a HAN-mode liquid-crystal display device, the direction in which the absolute value of the retardation of the film is the smallest is neither the in-plane direction nor the normal direction of the optical compensatory film. The optical properties of the optical compensatory film for use in an OCB-mode liquid-crystal display device or in a HAN-mode liquid-crystal display device depend on the optical properties of the optically-anisotropic layer, the optical properties of the support and the configuration of the optically-anisotropic layer and the support of the film. Optical compensatory films for use in an OCB-mode liquid-crystal display device and a HAN-mode liquid-crystal display device are described in JP-A-9-197397. In addition, they are also described in Mori et al's report (*Jpn. J. Appl. Phys.*, Vol. 38 (1999), p. 2837).

Reflection-Type Liquid-Crystal Display Device:

The cellulose acylate film of the invention may be advantageously used as the optical compensatory film of TN-mode, STN-mode, HAN-mode or GH (guest-host)-mode reflection-type liquid-crystal display devices. These display modes are well known from the past. TN-mode reflection-type liquid-crystal display devices are described in JP-A-10-123478, WO98/48320, Japanese Patent 3022477. Optical compensatory films for use in reflection-type liquid-crystal display devices are described in WO00/65384.

Other Liquid-Crystal Display Devices:

The cellulose acylate film of the invention may be advantageously used as a support of the optical compensatory film in an ASM (axially symmetrically aligned microcell)-mode liquid-crystal cell-having ASM-mode liquid-crystal display device. The ASM-mode liquid-crystal cell is characterized in that the cell thickness is held by a position-controllable resin spacer. The other properties of the cell are the same as those of the TN-mode liquid-crystal cell. ASM-mode liquid-crystal cells and ASM-mode liquid-crystal display devices are described in Kume et al's report (Kume et al., *SID 98 Digest* 1089 (1998)).

EXAMPLES

The characteristics of the invention are described more concretely with reference to the following Examples and Comparative Examples. In the following Examples, the material used, its amount and the ratio, the details of the treatment and the treatment process may be suitably modified or changed not overstepping the spirit and the scope of the invention. Accordingly, the invention should not be limitatively interpreted by the Examples mentioned below.

Preparation of Films:

The following cellulose acylate films A to H (hereinafter abbreviated as films A to H) were prepared for use in Examples and Comparative Examples.

Film A: Film prepared according to Example 1 in JP-A-2005-104148 (film thickness: 80 μm).

Film B: Commercially-available film, FUJITAC (T80UZ, by Fuji Photo Film).

Film C: Commercially-available film, FUJITAC (TD80UL, by Fuji Photo Film).

Film D: Film prepared in the same manner as that for the film A, to which, however, the same amount of the modifier B described in Example 2 in JP-A-2005-89680 was added in place of the plasticizer A and the plasticizer B added to the film A.

Film E: Film prepared in the same manner as that for the film A, to which, however, the same amount of the epoxy resin (Araldite EPN1179, by Asahi Kasei Epoxy) used in the film sample No. 7 in the Examples in JP-A-2002-146044 was added in place of the plasticizer A and the plasticizer B added to the film A.

Film F: Commercially-available Zeonor film (by Nippon Zeon, having a thickness of 100 μm, and a water vapor permeability 0 g/(m$^2$·day) at 40° C. and 90% RH (in terms of the film having a thickness of 80 μm).

Film G: Film prepared according to Example 12 in JP-A-2005-104148 (film thickness: 80 μm).

Film H: Film prepared according to Example 1 in JP-A-2005-104148 (film thickness: 40 μm).

Heat Treatment 1:

In Samples 1 to 17, the films shown in Table 1 were used. The water vapor permeability of each film used therein (this is the water vapor permeability of the original film) is shown in Table 1. With both edges of the film held by tenter clips, the film was subjected to heat treatment by leading it through the heat-treatment zone heated at the temperature shown in Table 1, for the period of time also shown in Table 1. In this treatment, the film was made to run while the width of the rail was kept the same from the inlet port to the outlet port. In Samples 12 and 14, the films were not subjected to heat treatment, and the film C and the film D, respectively, were tested for their evaluation below.

Heat Treatment 2:

This is the same as the above heat-treatment 1 except for the following: Both edges of each film of Samples 101 to 103 were clipped with a tenter clip, then the rail was expanded in the cross direction in such a degree that the film could be expanded in the cross direction for removing its relaxation, and while the rail width was kept as such, the film was led to pass through the heat treatment zone.

Formation of Hard Coat Layer (Samples 201, 205):

250 g of a mixture of dipentaerythritol pentaacrylate and dipentaerythritol hexaacrylate (DPHA, by Nippon Kayaku) was dissolved in 439 g of a mixed solvent of methyl ethyl ketone/cyclohexanone=50/50 (% by mass). A solution prepared by dissolving 7.5 g of a photopolymerization initiator (Irgacure 907, by Ciba-Geigy) and 5.0 g of a photosensitizer (Kayacure DETX, by Nippon Kayaku) in 49 g of methyl ethyl ketone was added to the above solution. The resulting solution was applied onto a substrate and cured with UV rays, and the refractive index of the thus-formed film was 1.51. The solution was filtered through a polypropylene filter having a pore size of 30 μm to prepare a coating liquid for a hard coat layer.

The cellulose acylate film in Table 1 that had been subjected to the above heat treatment was saponified according to the film saponification method used in forming the polarizer mentioned below. Then, using a bar coater, the above coating liquid was applied onto the film, then dried at 120° C., and the coating layer was cured through irradiation with UV rays having an intensity of illumination of 400 mW/cm$^2$ and an intensity of irradiation of 300 mJ/cm$^2$, using an air-cooled metal halide lamp having a power of 160 W/cm (by Eye Graphics), thereby forming a hard coat layer having a thickness of 4 μm.

Formation of Antiglare Layer (Sample 202):

With stirring with an air disperser, 217.0 g of a zirconium dioxide ultrafine particle dispersion-containing hard coat layer-forming liquid (KZ-7886A, by JSR) was added to a mixed solvent of 104.1 g of cyclohexanone and 61.3 g of methyl ethyl ketone. The solution was applied onto a substrate, and cured with UV rays, and the thus-formed coating film had a refractive index of 1.61. 5 g of crosslinked polystyrene particles having a mean particle size of 2 μm (tradename, SX-200H by Soken Chemical) were added to the solution, stirred and dispersed for 1 hour at 5000 rpm with a high-speed disperser, then filtered through a polypropylene filter having a pore size of 30 μm to prepare a coating liquid for an antiglare layer.

Using a bar coater, the obtained coating liquid was applied onto the hard coat layer of the film shown in Table 1, dried at 120° C., and the coating layer was cured through irradiation with UV rays having an intensity of illumination of 400 mW/cm$^2$ and an intensity of irradiation of 300 mJ/cm$^2$, using an air-cooled metal halide lamp having a power of 160 W/cm (by Eye Graphics) in a nitrogen-purged atmosphere having an oxygen concentration of 0.01%, thereby forming an antiglare layer having a thickness of 1.5 μm.

Formation of Antireflection Layer (Sample 203):

200 g of methyl isobutyl ketone was added to 200 g of thermally-crosslinking fluoropolymer having a refractive index of 1.46 (JN-7221, by JSR), stirred, and then filtered through a polypropylene filter having a pore size of 1 μm to prepare a coating liquid for a low-refractivity layer.

Using a bar coater, the obtained coating liquid was applied onto the antiglare layer of the film shown in Table 1, dried at 80° C., and then heated at 120° C. for 10 minutes to promote the thermal crosslinking reaction, thereby forming a low-refractivity layer having a thickness of 0.096 μm.

Formation of Polymer Layer (Samples 204, 206):

A polyimide (having a mass-average molecular weight (Mw) of 70,000 and having Δn of about 0.04) produced from 2,2'-bis(3,4-dicarboxyphenyl)hexafluoropropane dianhydride (6FDA) and 2,2'-bis(trifluoromethyl)-4,4'-diaminobiphenyl (TFMB) was dissolved in cyclohexanone (solvent) to prepare a coating liquid for a polymer layer having a controlled concentration of 25% by mass.

The cellulose acylate film in Table 1 that had been subjected to the above heat treatment was saponified according to the film saponification method used in forming the polarizer mentioned below. Then, using a bar coater, the above coating liquid was applied onto the film, and heated at 100° C. for 10 minutes to form thereon a polymer layer having a thickness of 5.0 μM.

Evaluation of Cellulose Acylate Film:

The water vapor permeability of each cellulose acylate film obtained was measured. On the basis of the found data thereof, the water vapor permeability of the film in terms of the value thereof having a thickness of 80 μm, and the water vapor permeability ratio of the film before and after the heat treatment thereof (water vapor permeability after heat treatment/water vapor permeability before heat treatment) were computed. In addition, each cellulose acylate film was subjected to thermo-treatment of keeping it at 60° C. and 95% RH for 1000 hours, and the water vapor permeability of the film after the thermo-treatment was measured. Based on the found data thereof, the water vapor permeability change of the film before and after the thermo-treatment thereof (water vapor permeability after thermo-treatment−water vapor permeability before thermo-treatment) was computed.

The test results are all shown in Table 1 below.

TABLE 1

| | | Original Film | | | | Test Result of Film after Heat Treatment | |
|---|---|---|---|---|---|---|---|
| | | Water Vapor Permeability of | Heat Treatment | | | | Water vapor |
| Sample No. | Type of Film | Original Film [g/(m$^2$·day)] | Temperature [° C.] | Time [min] | Note | Thickness [μm] | Permeability [g/(m$^2$·day)] |
| 1 | FilmA | 522 | 200 | 1 | Invention | 82.1 | 388 |
| 2 | FilmB | 528 | 180 | 1 | Comparative | 83.9 | 451 |
| 3 | FilmB | 528 | 200 | 1 | Invention | 82.1 | 389 |
| 4 | FilmB | 528 | 220 | 1 | Invention | 81.9 | 375 |
| 5 | FilmB | 528 | 240 | 1 | Invention | 81.8 | 361 |
| 6 | FilmB | 528 | 200 | 0.02 | Invention | 82.7 | 392 |
| 7 | FilmB | 528 | 200 | 0.5 | Invention | 82.1 | 389 |
| 8 | FilmB | 528 | 200 | 5 | Invention | 84.3 | 370 |
| 9 | FilmC | 431 | 200 | 1 | Invention | 89.4 | 339 |
| 10 | FilmC | 431 | 220 | 1 | Invention | 91.6 | 311 |
| 11 | FilmC | 431 | 240 | 1 | Invention | 91.1 | 289 |
| 12 | FilmC | 431 | (not treated) | 0 | Comparative | 80.0 | 431 |
| 13 | FilmD | 312 | 200 | 5 | Comparative | 89.1 | 281 |
| 14 | FilmD | 312 | (not treated) | 0 | Comparative | 80.0 | 312 |
| 15 | FilmE | 319 | 200 | 5 | Comparative | 89.6 | 292 |
| 16 | FilmG | 425 | 240 | 1 | Invention | 90.9 | 285 |
| 17 | FilmH | 897 | 240 | 1 | Invention | 40.8 | 613 |
| 101 | FilmG | 425 | 200 | 1 | Invention | 80.1 | 384 |
| 102 | FilmG | 425 | 220 | 1 | Invention | 77.5 | 352 |
| 103 | FilmG | 425 | 240 | 1 | Invention | 76.4 | 361 |

TABLE 1-continued

| | | | | | | | |
|---|---|---|---|---|---|---|---|
| 201 | Sample 5 | — | — | — | Invention | 85.8 | 235 |
| 202 | Sample 201 | — | — | — | Invention | 87.2 | 227 |
| 203 | Sample 202 | — | — | — | Invention | 87.3 | 222 |
| 204 | Sample 5 | — | — | — | Invention | 86.8 | 225 |
| 205 | Sample 17 | — | — | — | Invention | 44.8 | 398 |
| 206 | Sample 17 | — | — | — | Invention | 45.8 | 381 |

| | Test Result of Film after Heat Treatment | | | | | |
|---|---|---|---|---|---|---|
| Sample No. | Water Vapor Permeability as the film having a thickness of 80 μm [g/(m²·day)] | Water Vapor Permeability Ratio before and after heat treatment [times] | Water Vapor Permeability Change before and after thermo-treatment [g/(m²·day)] | Note | Degree of Polarization | |
| | | | | | original [%] | after thermo-treatment [%] |
| 1 | 398 | 0.74 | −1 | Invention | 99.9 | 99.9 |
| 2 | 473 | 0.85 | −5 | Comparative | 99.9 | 92.1 |
| 3 | 399 | 0.74 | −2 | Invention | 99.9 | 99.9 |
| 4 | 384 | 0.71 | −1 | Invention | 99.9 | 99.9 |
| 5 | 369 | 0.68 | 0 | Invention | 99.9 | 99.9 |
| 6 | 405 | 0.74 | −3 | Invention | 99.9 | 99.9 |
| 7 | 399 | 0.74 | −2 | Invention | 99.9 | 99.9 |
| 8 | 390 | 0.70 | 0 | Invention | 99.9 | 99.9 |
| 9 | 379 | 0.79 | −1 | Invention | 99.9 | 99.9 |
| 10 | 356 | 0.72 | 0 | Invention | 99.9 | 99.9 |
| 11 | 329 | 0.67 | 0 | Invention | 99.9 | 99.9 |
| 12 | 431 | — | — | Comparative | 99.9 | 97.8 |
| 13 | 313 | 0.90 | 411 | Comparative | 99.9 | 92.2 |
| 14 | 312 | — | — | Comparative | 99.9 | 90.1 |
| 15 | 327 | 0.92 | 353 | Comparative | 99.9 | 91.0 |
| 16 | 324 | 0.88 | −1 | Invention | 99.9 | 99.9 |
| 17 | 306 | 0.68 | 0 | Comparative | — | — |
| 101 | 384 | 0.90 | −1 | Invention | 99.9 | 99.9 |
| 102 | 341 | 0.83 | 0 | Invention | 99.9 | 99.9 |
| 103 | 345 | 0.85 | 0 | Invention | 99.9 | 99.9 |
| 201 | — | — | −1 | Invention | 99.9 | 99.9 |
| 202 | — | — | −1 | Invention | 99.9 | 99.9 |
| 203 | — | — | 0 | Invention | 99.9 | 99.9 |
| 204 | — | — | 0 | Invention | 99.9 | 99.9 |
| 205 | — | — | −1 | Invention | 99.9 | 99.8 |
| 206 | — | — | −1 | Invention | 99.9 | 99.9 |

As in Table 1, according to the method of the invention, water vapor permeability was reduced and films, of which the water vapor permeability did not increase after thermo-treatment, were produced (Samples 1, 3-11, 16, 17, 101-103 and 201-206). As opposed to these, the films to which was added a hydrophobic additive as in Samples 13 and 15 could have a low initial water vapor permeability, but their water vapor permeability after thermo-treatment significantly increased.

Films were produced in the same manner as Samples 1, 3-11, 16, 17, 101-103 and 201-206, for which, however, the heat-treatment time was changed to 20 minutes, 40 minutes, 60 minutes and 80 minutes. As a result, after the heat treatment for 20 minutes, 40 minutes or 60 minutes, the films produced were all good in point of the water vapor permeability thereof. The films that had been subjected to heat treatment for 20 minutes, 40 minutes, 60 minutes or 80 minutes were tested and evaluated for their yellowing resistance and producibility. The yellowing resistance was evaluated as follows: Five sheets of the film were stacked up and five panelists visually tested them. The points (5 (transparent) to 1 (yellowed)) given by them were averaged. The acceptable level is 3 or more; 4 is favorable; and 5 is the best. The producibility was evaluated as 4 ranks of A (excellent), B, C, D (bad). The relationship between the heat-treatment time, and the yellowing resistance and the producibility is shown in Table 2.

TABLE 2

| Heat-Treatment Time | Yellow Resistance | Producibility |
|---|---|---|
| 20 min | 5 | A |
| 40 min | 4 | A/B |
| 60 min | 3 | B |
| 80 min | 1 | D |

As in Table 2, according to the method of the invention, the degree of yellowing of the films produced was gradually higher and their producibility lowered with the increase in the heat-treatment time from 20 minutes to 40 minutes and to 60 minutes and, but it is within an acceptable range. When the heat-treatment time was 80 minutes, the films yellowed to such a degree that they are unsuitable for optical films, and their producibility was extremely poor. In addition, the films subjected to heat treatment for 80 minutes were brittle.

Formation of Polarizer:

The films of Samples 1-16, 101-103 and 201-206 and Film F were saponified according to the process mentioned below, and formed into polarizers.

1) Saponification of Film:

The film was dipped in an aqueous NaOH (1.5 mol/L) solution (saponification solution) that had been conditioned at 55° C., for 2 minutes, then washed with water, and then dipped in an aqueous sulfuric acid (0.05 mol/L) solution for 30 seconds, and thereafter led to pass through a water bath. Then, this was dewatered repeatedly three times with an air knife to remove water, and then kept in a drying zone at 70° C. for 15 seconds to be dried. The process gave a saponified film.

2) Formation of Polarizing Film:

According to Example 1 in JP-A-2001-141926, the film was stretched in the machine direction between two pairs of nip rolls running at a different peripheral speed, thereby preparing a polarizing film having a thickness of 20 μm.

3) Lamination:

The obtained polarizing film was sandwiched between the above-mentioned two saponified films in such a manner that the machine direction of the saponified film could be in parallel to the machine direction of the polarizing film, via an adhesive of an aqueous 3% PVA (Kuraray's PVA-117H) solution put therebetween, and laminated in on-line operation, thereby producing a polarizer. The film F could not produce a polarizer, since its adhesiveness to the polarizing film was poor.

Evaluation of Polarizer:

The produced polarizers were analyzed and evaluated as follows:

1) Initial Degree of Polarization:

Two sheets of the produced polarizers were stacked up with their absorption axes kept in parallel to each other, and the transmittance (Tp) was measured. They were stacked up with their absorption axes kept vertical to each other, and the transmittance (Tc) was measured. The degree of polarization (P), as represented by the following formula, was computed.

$$\text{Degree of Polarization } P=((Tp-Tc)/(Tp+Tc))^{0.5}$$

All the polarizers produced from the films of Samples 1-16, 101-103 and 201-206 had a good degree of polarization.

2) Degree of Polarization 1 after Aging:

The polarizer was stuck to a glass plate with an adhesive, and subjected to thermo-treatment of keeping them at 60° C. and 95% RH for 1000 hours. After the thermo-treatment, the degree of polarization (degree of polarization 1 after aging) of the polarizer was computed according to the same method as that for the initial degree of polarization thereof. The results are shown in Table 1. All the polarizers produced from the films of Samples 1-16, 101-103 and 201-206 still had a good degree of polarization of. However, the degree of polarization of the polarizers produced from the films of Samples 2 and 12-15 lowered.

3) Degree of Polarization 2 after Aging:

The polarizer was stuck to a glass plate with an adhesive, and left at 90° C. and 0% RH for 500 hours. After thus left, the degree of polarization (degree of polarization 2 after aging) of the polarizer was computed according to the above-mentioned method. All the polarizers produced from the films of Samples 1-16, 101-103 and 201-206 still had a good degree of polarization of at least 99.8%.

Evaluation in Mounting on TN-Mode Liquid-Crystal Display Device 1:

The polarizer was built in a TN-mode liquid-crystal display device (AQUOS LC20C1S, by Sharp) in place of its original polarizer, and the device was kept at 60° C. and 95% RH for 1000 hours, and then visually checked. When the polarizer of the invention was built therein, then the device displayed good images; but when the polarizer of Comparative Example was built in, then white skipping was seen in the images given by the device.

Evaluation-2 in Mounting on TN-Mode Liquid-Crystal Display Device:

In producing the above polarizer, one of the two films between which the polarizing film was to be sandwiched was replaced by a film prepared by saponifying an optically-compensatory layer-having WV film, Wide View A WV A03B (by Fuji Photo Film), and a different polarizer was produced. The thus-produced polarizer was built in a TN-mode liquid-crystal display device (AQUOS LC20C1S, by Sharp) in place of its original polarizer, in such a manner that the side of the WV film could face the liquid-crystal cell side, and the device was kept at 60° C. and 95% RH for 1000 hours, and then visually checked. When the polarizer comprising the film of Example was built therein, then the device displayed good images; but when the polarizer comprising the film of Comparative Example was built in, then white skipping was seen in the images given by the device.

Evaluation in Mounting on VA-Mode Liquid-Crystal Display Device:

The polarizer was built in a VA-mode liquid-crystal display device (32 V-mode high-definition liquid-crystal TV monitor, W32-L7000, by Hitachi), and the device was kept at 60° C. and 95% RH for 1000 hours, and then visually checked. When the polarizer of the invention was built therein, then the device displayed good images; but when the polarizer of Comparative Example was built in, then white skipping was seen in the images given by the device.

INDUSTRIAL APPLICABILITY

The invention provides a cellulose acylate film having a low water vapor permeability, of which the water vapor permeability does not increase even when it is kept under wet heat, and this is usable as excellent optical compensatory films. Since the cellulose acylate film of the invention has such a suitable water vapor permeability, it can be stuck to a polarizing film in on-line operation, therefore giving polarizers having excellent wet heat resistance at high producibility. In addition, the invention provides a liquid-crystal display device of high reliability. Accordingly, the industrial applicability of the invention is good.

The invention claimed is:

1. A cellulose acylate film having a water vapor permeability at 40° C. and 90% RH of from 100 to 400 g/(m²·day), of which the water vapor permeability change after kept at 60° C. and 95% RH for 1000 hours is from −100 g/(m²·day) to 10 g/(m²·day).

2. The cellulose acylate film according to claim 1, wherein the thickness of the film is from 20 to 100 μm.

3. The cellulose acylate film according to claim 1, which has at least one layer selected from the group consisting of a hard coat layer, an antiglare layer, an antireflection layer and a polymer layer, on the surface.

4. A polarizer comprising at least one cellulose acylate film of claim 1.

5. A liquid-crystal display device comprising at least one cellulose acylate film of claim 1.

6. A liquid-crystal display device having a structure that comprises a liquid-crystal cell, a polarizing film and a protective film in that order, wherein the protective film is a cellulose acylate film of claim 1.

* * * * *